United States Patent [19]

Dundas

[11] 4,246,208
[45] Jan. 20, 1981

[54] DUST-FREE PLASMA SPHEROIDIZATION

[75] Inventor: Peter H. Dundas, Pittsford, N.Y.

[73] Assignee: Xerox Corporation, Stamford, Conn.

[21] Appl. No.: 22,748

[22] Filed: Mar. 22, 1979

[51] Int. Cl.³ .............................................. B01J 2/16
[52] U.S. Cl. ........................................ 264/14; 264/15
[58] Field of Search ....................... 264/14, 15; 425/10

[56] References Cited
U.S. PATENT DOCUMENTS

| | | | |
|---|---|---|---|
| 3,313,602 | 4/1967 | Smith et al. | 264/15 |
| 3,836,611 | 9/1974 | Mavrovic | 264/14 |
| 4,019,842 | 4/1977 | Forgensi | 264/15 |

*Primary Examiner*—Donald E. Czaja
*Assistant Examiner*—James R. Hall

[57] ABSTRACT

A method of manufacturing dust-free spheroidized magnetite beads comprising the steps of introducing raw magnetic ore particles in the presence of an inert non-oxidizing carrier gas to a carbon arc plasma flame assembly to which is fed a controlled amount of nitrogen and argon gas, melting the ore particles to form spheroidized droplets thereof, allowing the spheroidized droplets to fall by gravity in a chamber having a controlled atmosphere while at the same time sweeping the inside chamber wall with a vertical flow of air or an inert gas and providing a horizontal curtain of air or an inert gas at a specific location within the chamber to remove dust formed in the process. The droplets are cooled forming beads of ore, which may be used as a xerographic carrier without further processing.

2 Claims, 3 Drawing Figures

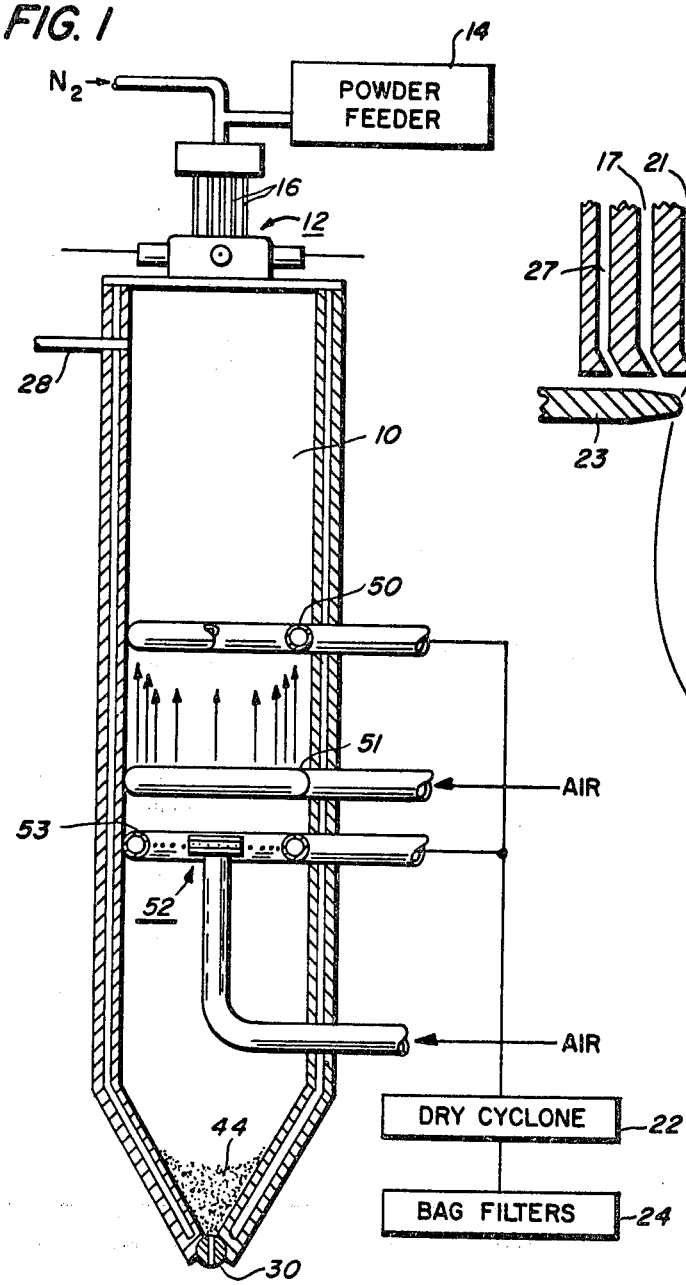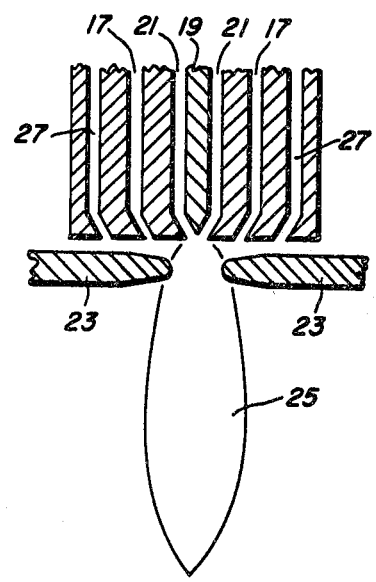

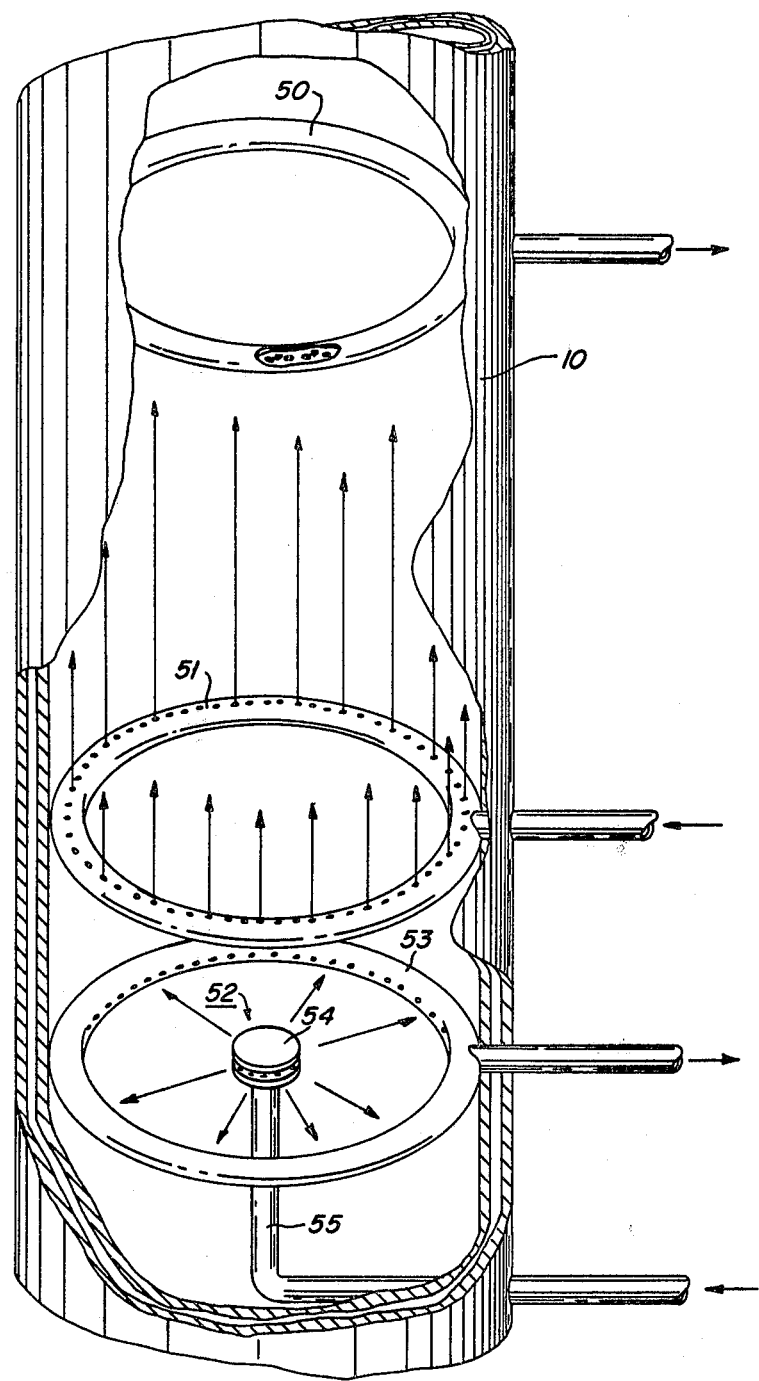

DUST-FREE PLASMA SPHEROIDIZATION

The invention relates in general to a method for producing electrostatographic carrier beads and specifically to improving the efficiency of such a system by producing beads having decreased dust contamination.

A method and apparatus for preparing carrier beads for use in xerographic development systems is disclosed in commonly owned U.S. Pat. Nos. 4,019,842 and 4,076,640, issued Apr. 26, 1977, and Feb. 28, 1978, respectively, to Rudolph Forgensi and Robert J. Hagenbach, the disclosures of which are hereby incorporated by reference. Carrier bead cores made utilizing the methods and apparatus disclosed therein provide excellent carrier cores for use in magnetic brush developing systems; however, the efficiency of the system suffered due to the production of "fines", that is, a submicron dust, which is inherently produced in the plasma furnace. This dust, a portion of which ends up attached to the spheroidized carrier beads, must be removed prior to use of the beads as a carrier core material. The system as described in the above-referenced patents was found to produce spheroidized particles contaminated with more than about 1.5% by weight fines.

The invention as claimed is intended to improve the efficiency of removing dust fines from the spheroidized particles. In accordance with this invention, the prior art system of introducing low-cost magnetic bore particles to a plasma flame heating device in the presence of at least one gas, melting and spheroidizing the ore particles in a closed chamber having a controlled atmosphere, allowing the ore particles to fall by gravity and cool to a solid is improved further by providing a horizontal flow of, e.g., air through which the particles must fall. The air is used to remove dust fines by entrainment in the air. Preferably, the system also includes a vertical flow of air adjacent the chamber wall to prevent dust agglomeration on the wall.

FIG. 1 is a generalized schematic diagram of the carbon arc plasma flame assembly and the spheroidization chamber;

FIG. 2 illustrates the internal operation of the carbon arc plasma flame assembly; and FIG. 3 is a schematic isometric drawing illustrating the relationship of the distributors and exhaust toroids.

Referring now to FIGS. 1 and 3, there is seen water jacketed spheroidization chamber 10 fitted with a carbon arc plasma flame assembly 12. The spheroidization chamber 10 and, more specifically, the plasma flame assembly 12 is provided with a powder feeder 14 including feeder tubes 16 having feed ports for directing the ore to the arc region. The spheroidization chamber 10 is typically from about 10 to about 30 feet in height and is fitted with a water jacket. The spheroidization chamber 10 is fitted with a purge system indicated as inlet conduit 28 providing an internal flow of nitrogen to the spheroidization chamber 10. Additionally, an air or nitrogen distributor 52 is provided to form a horizontally moving curtain of gas between distributor 52 and outlet gas toroid 53. Preferably, a tubular gas distributor 51, which also rings the spheroidization chamber 10, is used to provide a vertical sweep of air to a second outlet gas toroid 50. The outlet effluent containing dust fines from gas toroids 50 and 53 is exhausted from the spheroidization chamber 10 through cyclone separator 22, the fines being collected in bag filters 24 for disposal. The product 44 can be used directly, thus eliminating a costly classification process step.

Referring now to FIG. 2, the interior of the carbon arc plasma flame assembly 12 is shown in greater detail. The ore particles are introduced to the plasma flame assembly 12 via feeder ports 17 from ore feeder tubes 16 along with an inert non-oxidizing carrier gas, such as nitrogen, by means of a high-pressure supply or the like shown in FIG. 1. Cathode 19 is connected to a DC power supply system (not shown). In addition, cathode 19 is provided with a source of argon gas fed through lines 21 by means of a high-pressure supply or the like (not shown). Carbon anodes 23 are mounted above the insulating upper surface of the spheroidization chamber 10 and are positioned perpendicular to the cathode 19. The plasma furnace having a 400 kw arc head with one cathode 19 and three carbon anodes 23 as an example will provide temperatures of up to about 10,000° K. The anodes 23 are fed, along with nitrogen gas, which acts as a seal at the anode port, to the arc region to maintain the desired electrical potential between each anode 23 and the cathode 19. Cathode 19 in cooperation with carbon anodes 23 provide the electrical arcs, which ionize the feed gases to form plasma flame 25 via port 27.

In operation, powder feeder 14 is loaded with magnetic ore particles of the approximate desired particle size in the range of from about 5 microns to about 600 microns. Cathode 19 and carbon anodes 23 are energized by an electrical power source and in cooperation with the feed gases provide plasma flame 25. The ore particles are fed via feeder tubes 16 to the common arc plasma flame 25 in the presence of an inert non-oxidizing carrier gas. It has been found that feeding the ore particles in the presence of nitrogen gas provides good heat transfer to the ore particles during processing thereby improving the efficiency of the process. Other gases, which have good heat transfer properties, may also be used for this purpose.

Because of the extreme heat generated in the plasma arc region, the ore particles passing therethrough become melted globules. As the melted globules fall by gravity into the spheroidization chamber, 10 the globules spheroidize, cool and collect at the bottom of the spheroidization chamber 10. The proper conditions for the plasma flame 25 are created by adjusting the flow rate of the ore particles, the flow rate of the feed gases and the voltage and current of the cathode 19 and of the anodes 23.

The globules thus formed fall from the arc region of the plasma flame 25. As they cool, the droplets solidify in spherical form. The collecting area serves also to cool as well as collect the spheroidized particles 44. From the collecting area, the particles are discharged through conduit 30.

In order to provide particles 44, which may be used directly without cleaning or using a separate classification step, the particles are subjected to a flow of gas, conveniently air, to remove dust fines, which are inherently produced in the plasma process. An upward vertical flow of air is provided along the circumference of the wall of spheroidization chamber 10 to prevent dust fines, produced as a by-product of the spheroidization process, to deposit and agglomerate on the spheroidization chamber wall 10. Circular tubular gas distributor 51, which rings the wall of spheroidization chamber 10 is used to direct a stream of air upwardly at a superficial velocity of about 0.2 feet/second. This is important since agglomerated dust can form particles large enough to fall through the horizontal air curtain described below. The flow of air from gas distributor 51 and the dust fines entrained therein are removed by exhaust gas toroid 50, which rings the circumference of spheroidization chamber 10 similarly to distributor 51.

The falling solid spheroidized particles are then subjected to a horizontal flow of gas, conveniently air, to remove additional dust. This air is provided through distributor 52, the air and entrained dust being discharged from the spheroidization chamber 10 through a toroid 53, which rings the spheroidization chamber 10 walls similarly to outlet gas toroid 50 and distributor 51. Airflow in the range of 1000 to 5000 standard cubic feet/hour has been found satisfactory. Whereas the system described in U.S. Pat. Nos. 4,019,842 and 4,076,640 provides particles containing usually more than 1.5% by weight dust contamination, subjecting the particles to the vertical flow of gas and to the horizontal flow of gas provides particles containing less than 0.2% by weight dust. The airflows given above are for a spheroidization chamber 10 having an internal diameter of about 36 inches and a height of about 22 feet. Distributor 52 is made by bolting a blank flange 54 to a flanged 2-inch inlet pipe 55. Washers are placed on the bolts to provide an annular space of about 0.125 inch, which provides almost 360° horizontal and radial flow from the center of the spheroidization chamber 10 to exhaust outlet gas toroid 53. The gas distributor 51 is ¾ inch tubular pipe. The gas outlet gas toroids 50 and 53 are 2-inch tubular pipes (50, 53). Rings 50 and 51 are spaced approximately four feet apart. Outlet gas toroid 50, distributor 51 and outlet gas toroid 53 have approximately 250 0.187 inch holes drilled in them. Obviously, for other size spheroidization chambers 10, the outlet gas toroids 50 and 53 and distributors 51 and 52 measurements and airflows might have to be modified accordingly.

While the invention has been described with reference to specific preferred embodiments, it will be apparent to those skilled in the art that various substitutions, alterations and modifications may be made therein without departing from the spirit and scope of the invention. Such substitutions, alterations and modifications are intended to be within the scope of this invention.

What is claimed is:

1. In a method for manufacturing spheroidized beads in which ore particles are fed to the top of a spheroidization chamber, the ore particles being melted as a result of falling through a carbon arc plasma flame, the molten ore particles continuing to fall and by cooling being solidified forming beads, the beads being collected in the bottom of the spheroidization chamber and wherein dust particles are also formed in the spheroidization chamber inherently as a by-product of the ore melting and solidifying process, the improvement comprising providing, through a gas distributor, a horizontal flow of gas in the spheroidization chamber, the horizontal flow of gas being in the path of the falling solidified beads and dust particles, the flow of gas being of a quantity sufficient to entrain at least a portion of the dust particles and also of sufficient quantity to remove the thus entrained dust particles from the spheroidization chamber through an outlet gas toroid located in the spheroidization chamber in a position substantially horizontal to the position of the gas distributor.

2. The method as claimed in claim 1 and further including the additional step of providing an upward flow of gas from a second gas distributor positioned around the inside periphery of the spheroidization chamber and above the outlet gas toroid, the upward flow of gas being of a quantity sufficient to remove at least a portion of the dust particles, which might otherwise adhere to the inner wall of the spheroidization chamber, the gas flow further being of a sufficient quantity to lift the thus removed dust particles and to carry the dust particles out of a second outlet gas toroid located around the inside periphery of the spheroidization chamber above the second gas distributor.

* * * * *